(12) United States Patent
Classen

(10) Patent No.: US 8,573,054 B2
(45) Date of Patent: Nov. 5, 2013

(54) MANUFACTURING METHOD FOR A ROTATION SENSOR DEVICE AND ROTATION SENSOR DEVICE

(75) Inventor: Johannes Classen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1099 days.

(21) Appl. No.: 12/553,090

(22) Filed: Sep. 2, 2009

(65) Prior Publication Data

US 2010/0058863 A1 Mar. 11, 2010

(30) Foreign Application Priority Data

Sep. 2, 2008 (DE) .......................... 10 2008 041 757

(51) Int. Cl.
*G01C 19/00* (2013.01)

(52) U.S. Cl.
USPC .......................................... 73/504.12; 29/829

(58) Field of Classification Search
USPC ...................... 73/504.12, 493, 504.02; 29/829
See application file for complete search history.

(56) References Cited

U.S. PATENT DOCUMENTS

| | | | | |
|---|---|---|---|---|
| 5,203,208 A | * | 4/1993 | Bernstein | 73/504.12 |
| 5,889,207 A | * | 3/1999 | Lutz | 73/504.13 |
| 5,959,206 A | * | 9/1999 | Ryrko et al. | 73/504.12 |
| 6,117,701 A | * | 9/2000 | Buchan et al. | 438/52 |
| 6,393,913 B1 | * | 5/2002 | Dyck et al. | 73/504.12 |
| 6,561,028 B1 | * | 5/2003 | Aigner et al. | 73/504.11 |
| 6,715,353 B2 | * | 4/2004 | Johnson | 73/504.04 |
| 6,998,059 B2 | * | 2/2006 | Kuisma et al. | 216/2 |
| 7,066,004 B1 | * | 6/2006 | Kohler et al. | 73/1.38 |
| 7,212,944 B1 | * | 5/2007 | Kohler et al. | 702/145 |
| 7,520,169 B2 | * | 4/2009 | Schwarzelbach | 73/504.12 |
| 7,677,099 B2 | * | 3/2010 | Nasiri et al. | 73/504.12 |
| 7,934,423 B2 | * | 5/2011 | Nasiri et al. | 73/514.02 |
| 8,273,610 B2 | * | 9/2012 | Or-Bach et al. | 438/142 |
| 2004/0074301 A1 | * | 4/2004 | Kuisma et al. | 73/514.38 |
| 2007/0194857 A1 | * | 8/2007 | Schwarzelbach | 331/23 |
| 2008/0284078 A1 | * | 11/2008 | Wolter et al. | 267/154 |
| 2009/0001847 A1 | * | 1/2009 | Tsuboi et al. | 310/309 |
| 2009/0145225 A1 | * | 6/2009 | Nasiri et al. | 73/514.02 |
| 2012/0129301 A1 | * | 5/2012 | Or-Bach et al. | 438/129 |

FOREIGN PATENT DOCUMENTS

DE 19523895 1/1997

* cited by examiner

*Primary Examiner* — Peter Macchiarolo
*Assistant Examiner* — Samir M Shah
(74) *Attorney, Agent, or Firm* — Kenyon & Kenyon LLP

(57) ABSTRACT

A device and manufacturing method for a rotation sensor device includes a holding device, an oscillating mass, and a spring, via which the oscillating mass is connected to the holding device. The spring is designed so that the oscillating mass can be set into an oscillating movement around an oscillation axis with respect to the holding device with the aid of a drive. The steps include: producing a layer sequence having a first layer made of semiconductor material and/or metal and a second layer made of semiconductor material and/or a metal, a boundary surface of the first layer, at least partially being covered by an insulating layer; structuring the spring out of the first layer; and structuring at least one oscillating mass subunit of the oscillating mass, which can be set into the oscillating movement around the oscillation axis with the aid of the drive, out of the second layer.

12 Claims, 8 Drawing Sheets

MANUFACTURING METHOD FOR A ROTATION SENSOR DEVICE AND ROTATION SENSOR DEVICE

CROSS-REFERENCE TO RELATED APPLICATIONS

The present application claims priority to German Application No. 10 2008 041 757.2, filed in the Federal Republic of Germany on Sep. 2, 2008, which is expressly incorporated herein in its entirety by reference thereto.

FIELD OF INVENTION

The present invention relates to a manufacturing method for a rotation sensor device and a corresponding rotation sensor device.

BACKGROUND INFORMATION

A micromechanical yaw-rate sensor is frequently used to ascertain information about a rotation behavior of a rotatable body.

FIGS. 1A and 1B show schematic illustrations of a typical micromechanical yaw-rate sensor having a sensitive axis to explain its functionality. The typical yaw-rate sensor is described in German Patent Application No. DE 195 23 895 A1.

Illustrated yaw-rate sensor 10 has a disc-shaped oscillating mass 12, which is connected via multiple springs 14 to a hub 16. Of the total of four springs 14, however, only two are shown in FIG. 1A. Springs 14 are situated in a circular central opening of oscillating mass 12, into which hub 16 projects. The end of hub 16 oriented opposite to oscillating mass 12 is fixedly connected to a substrate 18. Hub 16 and substrate 18 are subunits of a holding device, in which oscillating mass 12 is oscillatably situated. Further components of the holding device are not shown in FIGS. 1A and 1B for a better overview.

Drive electrodes 20, formed as comb electrodes, are formed on oscillating mass 12, only one of which is shown in FIG. 1A, however. Two drive electrodes 22, which work together, are fixedly connected to main substrate 18 for each drive electrode 20 of oscillating mass 12. A voltage U may be applied between drive electrode 20 of oscillating mass 12 and an adjacent drive electrode 22 of main substrate 18 via a control unit of yaw-rate sensor 10. The application of voltage U between drive electrodes 20 and 22 causes a rotational movement of oscillating mass 12 around an oscillation axis 24 in relation to substrate 18, oscillation axis 24 running perpendicularly to the surface of disc-shaped oscillating mass 12.

Sensor electrodes 26, which have the shape of electrode combs, are also situated on oscillating mass 12. Further sensor electrodes 28 are fixedly connected to substrate 18 adjacent to sensor electrodes 26 of oscillating mass 12. Each sensor electrode 26 of oscillating mass 12 and sensor electrode 28 of substrate 18, which works together therewith, are coupled to a power circuit having a capacitor 30. A rotational movement of oscillating mass 12 around oscillation axis 24 causes a change in capacitance C1 of capacitor 30. The rotational movement of oscillating mass 12 around oscillation axis 24, e.g., the associated angular velocity, is thus ascertainable by analyzing capacitances C1 of associated capacitors 30.

If yaw-rate sensor 10 experiences a rotation around a sensitive axis 32 of yaw-rate sensor 10 during a rotational movement of oscillating mass 12 around oscillation axis 24, Coriolis forces Fc act on oscillating mass 12, which cause an additional rotational movement of oscillating mass 12 around a rotational axis 34. See, e.g., FIG. 1B. One may also refer to the rotational movement of oscillating mass 12 around rotational axis 34 as tilting/pivoting of oscillating mass 12 in relation to a surface of substrate 18.

Tilting/pivoting of oscillating mass 12 around rotational axis 34 causes a distance reduction of a first end 36 of oscillating mass 12, which is spaced apart from rotational axis 34, and a distance increase of a second end 38, which is diametrically opposite to first end 36 of oscillating mass 12 in relation to substrate 18. In order to ascertain the increase and decrease in the distances of ends 36 and 38 to substrate 18, counterelectrodes 40 are formed on substrate 18 to ends 36 and 38 of oscillating mass 12. Each of ends 36 and 38 is coupled to associated counterelectrode 40 on a power circuit having a capacitor 42. The increase or decrease in the distance between one end 36 or 38 and associated counterelectrode 40 thus causes a change in a capacitance C2 of associated capacitor 42. The change in capacitance C2 is proportional to Coriolis forces Fc. Correspondingly, the change in capacitance C2 is also a function of the yaw rate of the rotational movement of yaw-rate sensor 10 around sensitive axis 32. By analyzing capacitances C2 of capacitors 42, the yaw rate of the rotational movement of yaw-rate sensor 10 around sensitive axis 32 may thus be determined.

FIG. 2 shows a top view of an oscillating mass of a second typical yaw-rate sensor having two sensitive axes to explain its functionality.

The illustrated disc-shaped oscillating mass 52 of yaw-rate sensor 50 has drive and sensor electrodes 20 and 26. Drive and sensor electrodes 22 and 28, which work together, are fixedly connected to a substrate (not shown) of yaw-rate sensor 50 adjacent to drive and sensor electrodes 20 and 26 of oscillating mass 52. Because the functionality of drive electrodes 20 and 22 for setting oscillating mass 52 into a rotational movement around an oscillation axis (not shown) and the functionality of sensor electrodes 26 and 28 for ascertaining the angular velocity of the rotational movement around the oscillation axis.

Oscillating mass 52 is connected via four meandering springs 54 to a hub 56. With the exception of hub 56, no further components of the holding device of yaw-rate sensor 50 are shown in FIG. 2. Springs 54 are designed in such a way that oscillating mass 52, which rotates around the oscillation axis, is tiltable/pivotable in relation to the holding device via both rotational axes 58 and 60. A tilting movement of this type around at least one rotational axis 58 or 60 is executed by oscillating mass 52 if yaw-rate sensor 50 experiences a rotation around at least one of its two sensitive axes during the rotational movement of oscillating mass 52 around the oscillation axis. A rotation of yaw-rate sensor 50 around the first sensitive axis lying on first rotational axis 58 causes oscillating mass 52 to tilt/pivot around second rotational axis 60. Correspondingly, a rotation of yaw-rate sensor 50 around the second sensitive axis lying on second rotational axis 60 results in tilting of oscillating mass 52 around first rotational axis 58.

This tilting/pivoting of oscillating mass 52 around at least one rotational axis 58 or 60 may be established in the way already described above with the aid of counterelectrodes (not shown), which are situated on the substrate. Yaw-rate sensor 50 thus has the advantage that a rotational movement of yaw-rate sensor 50 around an axis which lies in the plane spanned by the two sensitive axes is detectable.

However, for the oscillating mass 52 to be pivotable around both rotational axes 58 and 60, springs 54 must have the lowest possible bending stiffness and a comparatively low torsional stiffness. In order to ensure the low bending stiffness and the advantageous torsional stiffness of springs 54, springs 54 having a comparatively long minimum length and/or a meandering shape are typically necessary. A long minimum length of linear springs increases the total extension of yaw-rate sensor 50 significantly and thus makes it more difficult to situate yaw-rate sensor 50 on a rotatable body.

If meandering springs are used, a precise design layout of the yaw-rate sensor is made significantly more difficult. A meandering spring 54 also has an asymmetrical mass distribution along its longitudinal axis. The asymmetrical mass distribution of the at least one spring 54 may result in false results of yaw-rate sensor 50, for example, ascertainment of rotational movements which have not been executed. This is also referred to as disadvantageous cross-sensitivity of yaw-rate sensor 50 or crosstalk of the measuring signals detected with the aid of yaw-rate sensor 50.

Furthermore, the disadvantageous spring stiffness and/or torsional stiffness, which frequently still exists in spite of a relatively great length and/or a meandering shape of spring 54, requires a comparatively high drive voltage of the electrostatic drive having drive electrodes 20 and 22. However, applying such a high drive voltage places special requirements on the electrostatic drive and thus prevents a cost-effective embodiment of the electronic drive circuit.

The problem described on the basis of yaw-rate sensor 50 frequently also occurs in a yaw-rate sensor having only one sensitive axis.

SUMMARY OF INVENTION

The present invention provides a manufacturing method for a rotation sensor device (120, 150) having a holding device (126, 130, 134, 162, 164), an oscillating mass (122, 152), and at least one spring (124), via which the oscillating mass (122, 152) is connected to the holding device (126, 130, 134, 162, 164), the at least one spring (124) being designed in such a way that the oscillating mass (122, 152) can be set into an oscillating movement around an oscillation axis with respect to the holding device (126, 130, 134, 162, 164) with the aid of a drive, having the following steps: producing a layer sequence having a first layer (108) made of a semiconductor material and/or a metal and a second layer (112) made of a semiconductor material and/or a metal, a boundary surface of the first layer (108), which faces toward the second layer (112), being at least partially covered by an insulating layer (110) (S1); structuring the at least one spring (124) out of the first layer (108) (S21); and structuring at least one oscillating mass subunit of the oscillating mass (122, 152), which can be set into the oscillating movement around the oscillation axis with the aid of the drive (128, 130), out of the second layer (112) (S22); and a rotation sensor device (120, 150) having: a holding device (126, 130, 134, 162, 164); an oscillating mass (122, 152); and at least one spring (124), via which the oscillating mass (122, 152) is connected to the holding device (126, 130, 134, 162, 164), the at least one spring (124) being designed in such a way that the oscillating mass (122, 152) can be set into an oscillating movement around an oscillation axis with respect to the holding device (126, 130, 134, 162, 164) with the aid of a drive; wherein the at least one spring (124) has a first height (hf) along the oscillation axis and at least one oscillating mass subunit of the oscillating mass (122, 152), which can be set into the oscillating movement around the oscillation axis with the aid of a drive (128, 130), has a second height unequal to the first height (hf).

Embodiments of the present invention involve finding that a spring which is typically used for connecting the oscillating mass to the holding device has a height parallel to the oscillation axis which unfavorably increases the spring stiffness and/or the torsional stiffness of the spring. The oscillation axis is the axis around which the oscillating mass is set into a rotational movement with the aid of the electrostatic drive. A spring of this type therefore may be designed to be relatively long and/or meandering, in order to counteract the comparatively great height of the spring.

Embodiments of the present invention involve finding that the height of the at least one spring for connecting the oscillating mass to the holding device is reducible, by structuring the at least one spring out of another material layer as the at least one drive electrode of the electrostatic drive, which is attached to the oscillating mass.

Here, the terms used regarding the first layer and second layer being made of a semiconductor material and/or a metal do not establish any spatial configuration of the two layers to one another. For example, in the layer sequence, the first layer may also be situated over the second layer. To form the layer sequence, the second layer is applied first in this case. The insulating layer is then formed on the second layer. Subsequently, the first layer is applied on the insulating layer and possibly on at least one subarea of a boundary surface of the second layer which is only partially covered by the insulating layer.

In embodiments of the present invention, the first layer is formed having a first layer thickness and the second layer is formed having a second layer thickness unequal to the first layer thickness. In embodiments of the present invention, the first layer and the second layer may be formed in such a way that the second layer thickness is greater than the first layer thickness. This ensures an advantageous height of the spring using an easily executable manufacturing method according to the present invention.

In embodiments of the manufacturing method of the present invention, the first layer and the second layer are formed in such a way that the second layer thickness is greater than the first layer thickness by a factor of at least 5. This ensures, for example, a great height of at least one second electrode, which is formed from the second layer, in relation to the height of the at least one spring.

In typical yaw-rate sensors, the at least one spring for connecting the oscillating mass to the holding device is structured out of a material layer from which the at least one drive electrode of the electrostatic drive is formed. The at least one spring therefore typically has a height equal to the height of the at least one drive electrode. In order to generate a sufficient force to set the oscillating mass into the desired oscillation movement with the aid of the electrostatic drive, it is advantageous if the at least one drive electrode has a relatively great height. However, this relatively great height has a disadvantageous effect in typical yaw-rate sensors on the spring stiffness and/or the torsional stiffness of the at least one spring.

In an embodiment of the present invention, a layered film is formed, which has a first layer having a comparatively small layer thickness and a second layer having a comparatively great layer thickness. The two layers may be at least partially separated via an insulating layer, so that a boundary surface of the first layer which faces toward the second layer is at least partially covered by the insulating layer. The first layer and the second layer may be made of a semiconductor material and/or a metal. The first layer and the second layer may contain different materials. The at least one spring is structured out of the thin first layer. The at least one drive electrode fixedly connected to the oscillating mass for the electrostatic drive is structured out of the comparatively thick second layer before or after that.

The typical structuring of the springs from the material layer, which is used to form the at least one drive electrode of the electrostatic drive, has the result that the springs occupy a relatively large amount of space, which is not usable as an electrode surface. A desired miniaturization of a typical rotation sensor device is thus hardly possible using the technology according to the related art. A reduction of the radius and the moment of inertia of the rotor additionally reduces the advantageous torsional stiffness of the typical springs having the comparatively large extension along the rotational axis of the electrostatic drive and would thus require the production of even narrower springs or even more strongly meandering springs, which may typically be difficult to implement because of process variations, however. The problems described in this paragraph may be solved via the present invention, by structuring the springs out of a thin material plane. In this way, substantially simpler and more compact springs may be manufactured, which are soft in regard to a desired out-of-plane deflection.

The complexly constructed meandering springs of a typical yaw-rate sensor make the mechanical layout of the sensor element difficult and interfere with a desired symmetry of the spring suspension. Because of this loss of symmetry, a functional capability of a rotation sensor device is very sensitively a function of the precise location of the spring connection point. However, this problem may be solved by the use of simple and completely symmetric springs, which is possible via the present invention.

In an embodiments of the present invention, the manufacturing method includes the following additional steps: fixedly connecting at least one first electrode on the holding device; fixedly connecting at least one second electrode to the oscillating mass; and forming a drive, designed as an electrostatic drive, so that a voltage may be applied between the at least one first electrode and the at least one second electrode and the oscillating mass may be set into the oscillating movement around the oscillation axis by the voltage applied between the at least one first electrode and the at least one second electrode.

In a further embodiment, at least one electrode subunit of the second electrode may be structured out of the second layer, at least one through opening being formed over at least one subarea of the first layer in the insulating layer and the at least one through opening being filled with the material of the second layer, and a further electrode subunit of the second electrode being structured out of the at least one subarea of the first layer. The height of the at least one second electrode is thus at least the sum of the layer thicknesses of the first and second layers.

In an embodiment of the present invention, a further one-piece oscillating mass subunit of the oscillating mass is structured out of the first layer. The electrodes of the oscillating mass may be connected in this case via sectors which have a small height. The mass of the oscillating mass may thus be reduced in a simple way at an unchanged height of the at least one second electrode.

In embodiments of the present invention, at least one counterelectrode is structured out of the second layer, which is opposite to an oscillating mass partial surface structured out of the boundary surface of the first layer facing toward the second layer, a sensor unit being formed which is designed for the purpose of ascertaining a capacitance formed by the at least one counterelectrode and the at least one oscillating mass partial surface. The second layer may thus be additionally used to provide a material for the at least one counterelectrode.

In a further embodiment of the present invention, the manufacturing method includes the following additional steps: producing a first insulation layer on a substrate; producing a conductive layer on the first insulation layer; producing a second insulation layer on the conductive layer; producing the layer sequence on the second insulation layer; and structuring at least one conductor and/or at least one counterelectrode out of the conductive layer.

The insulating layer, the first insulation layer, and the second insulation layer may be formed from an insulating material, the first layer completely covering the first insulation layer and/or the second insulation layer as an etching protection layer during etching of the insulating layer. The at least one spring may thus be structured out of an etching protection layer, such as a gas phase etching protection layer. For manufacturing a rotation sensor device, layer sequences are frequently formed having a gas phase etching protection layer, which is to protect insulating layers situated underneath it during an etching step, for example. An etching protection layer of this type may be formed from a metal and/or silicon. Embodiments of the present invention offer a functionalization of an etching protection layer and of a plane of the etching protection layer. The rotation sensor device may be minimized by this multifunctionality of the etching protection layer.

If an etching protection layer is used for manufacturing the at least one spring, the thickness of this layer may be increased from its prior layer thickness, for example, between 0.3 µm and 0.6 µm, to a layer thickness between 1 µm and 3 µm. The increase in the etching protection layer thickness does not require any additional work-intensive steps.

The advantages described above paragraphs are also ensured in a corresponding rotation sensor device. Embodiments of the present invention may be used for a rotation sensor device having one sensitive axis and for a rotation sensor device having two sensitive axes. The at least one sensitive axis is perpendicular to the oscillation axis, around which the electrostatic drive of the rotation sensor device sets the oscillating mass into oscillations.

In an embodiment of the rotation sensor device, the second height is greater than the first height.

In an embodiment, the first height may be in a range between 0.3 µm and 3 µm and the second height may be in the range between 8 µm and 20 µm. This ensures an advantageous bending stiffness and/or torsional stiffness of the at least one spring with a sufficiently large contact surface of the at least one second electrode.

For example, the at least one spring, via which the oscillating mass is connected to the holding device, is a bar spring. A bar spring may be manufactured easily.

The advantages of the rotation sensor device described here may also be implemented via a corresponding manufacturing method.

In a further embodiment of the present invention, additional components of the rotation sensor device may be structured out of the material plane from which the at least one spring is completely formed. For example, electrodes for detecting a location of the oscillating mass with respect to the holding device may be formed from the material plane for the at least one spring. In an embodiment of the present invention, this may have the result that additional electrodes are formed to ascertain tilting of the oscillating mass. This increases the electrical sensitivity of the rotation sensor device by an increased capacitance per unit of surface area. The elevation of the sensitivity may be used either to increase the sensor performance, to suppress noise (with unchanged overall size), or to reduce the size of the rotation sensor device (with unchanged performance).

The areas of the drive and drive selection combs may furthermore be structured out of a layer having a comparatively great layer thickness. The sensitivity of the drive thus remains unchanged at a given drive voltage or a given drive force. Concurrently, by structuring the at least one spring and/or subareas of the rotor out of a significantly thinner layer, the spring stiffness and the moment of inertia of the sensor are significantly reduced compared to a typical yaw-rate sensor. Lower drive forces are thus required for setting the operating point. This has the advantage for the drive circuit that less drive voltage must be provided. For example, charge pumps having fewer stages may be used for the electrostatic drive. In an embodiment, charge pumps are no longer necessary due to the present invention, which saves surface area and costs in ASIC.

DETAILED DESCRIPTION

Figure 1A:
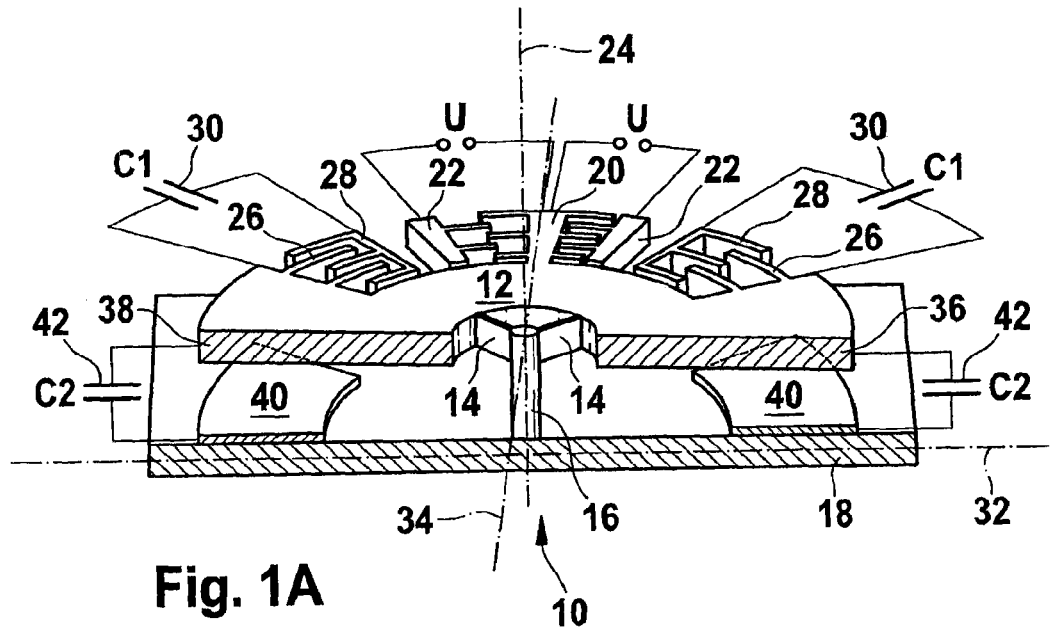
FIG. 1A shows a schematic illustration of a first typical yaw-rate sensor having one sensitive axis to explain the functionality.
Figure 1B:
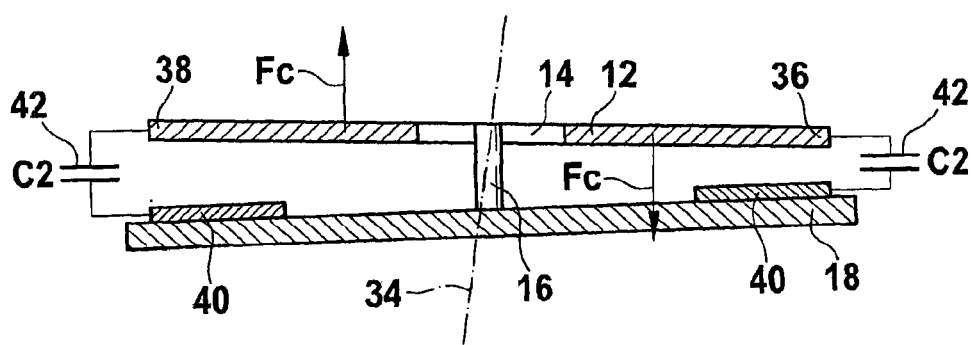
FIG. 1B shows a schematic illustration of a first typical yaw-rate sensor having one sensitive axis to explain the functionality.
Figure 2:
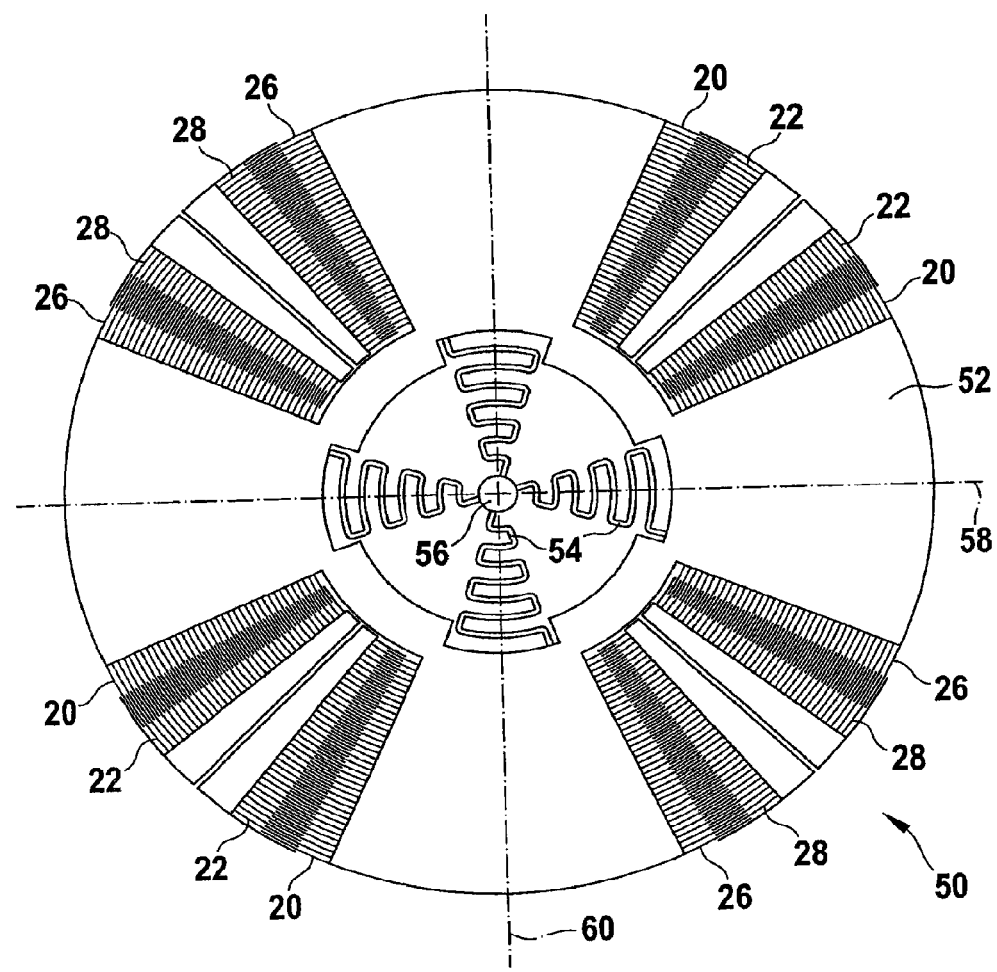
FIG. 2 shows a top view of an oscillating mass of a second typical yaw-rate sensor having two sensitive axes to explain the functionality.
Figure 3:
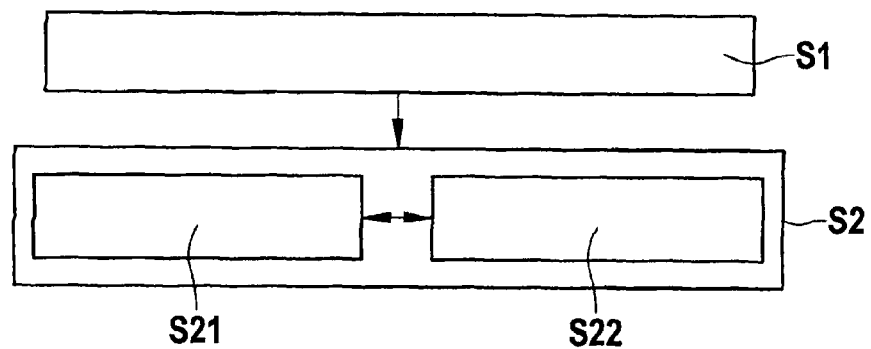
FIG. 3 shows a flow chart illustrating a first specific embodiment of the manufacturing method for a rotation sensor device.

FIG. 3 shows a flow chart to illustrate a first specific embodiment of the manufacturing method for a rotation sensor device.

In a step S1 of the manufacturing method, a layer sequence having at least one layer made of a semiconductor material and/or a metal and a second layer made of a semiconductor material and/or a metal is formed. The first layer and the second layer may have different materials. The two layers may also be formed from the same material. The first layer, for example, has a first layer thickness, which is different from a second layer thickness of the second layer. For example, the first layer thickness is less than the second layer thickness of the second layer. The first layer thickness is significantly less than the second layer thickness. For example, the first layer thickness may be less than the second layer thickness by at least a factor of 5. An insulating layer is formed between the first layer and the second layer, so that a boundary surface of the first layer facing toward the second layer is at least partially covered by the insulating layer. The insulating layer may have openings, so that the first layer has partial surfaces which contact the second layer. In this way, it is possible to couple areas of the second layer directly to the first layer.

In a further step S2 of the manufacturing method, individual components of the rotation sensor device are shaped out of the layer sequence formed in step S1. The rotation sensor device manufactured in this way has a holding device having at least one first electrode and an oscillating mass, to which at least one second electrode is fixedly connected. The first electrode and the second electrode are coupled to an electrostatic drive, via which a voltage may be applied between the two electrodes. The oscillating mass of the rotation sensor device is connected to the holding device via at least one spring. The at least one spring is designed so that the oscillating mass can be set into an oscillating movement around an oscillation axis by the application of the voltage between the first electrode and the second electrode. If the rotation sensor device experiences a rotation around a rotational axis which is not parallel to the oscillation axis, a Coriolis force acts on the oscillating mass, which is set into the oscillating movement around the oscillation axis. The at least one spring is additionally designed in such a way that the oscillating mass may be set by the Coriolis force into a rotational movement around a rotational axis which is oriented nonparallel to the oscillation axis.

The structuring out of the components of the rotation sensor device and explained in step S2 also includes structuring of the at least one spring out of the first layer (step S21) and structuring of at least one subunit of the second electrode, which is fixedly connected to the oscillating mass, out of the second layer (step S22). The labeling of steps S21 and S22 does not establish a sequence of the execution of the steps. The structuring out of the at least one spring in step S21 may be performed before or after the structuring out of the second electrode in step S22.

By structuring the at least one spring out of the first layer, which is significantly thinner than the second layer, it is ensured that the at least one spring has a significantly smaller height than the second electrode. The at least one spring may thus be manufactured in a simple way having an advantageous bending stiffness and a good torsional stiffness.

Figure 4:
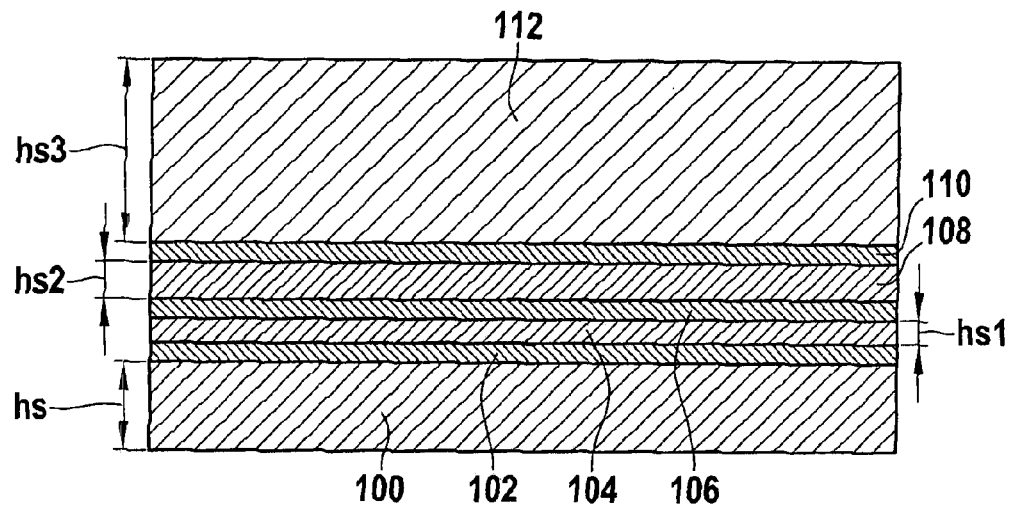
FIG. 4 shows a schematic illustration of a layer sequence to illustrate a second specific embodiment of the manufacturing method.

FIG. 4 shows a schematic illustration of a layer sequence to illustrate a second specific embodiment of the manufacturing method.

The illustrated layer sequence has a substrate 100, for example, made of silicon as the lowermost layer. Height hs of substrate 100 may be significantly greater than the layer thicknesses of the further layers of the layer sequence.

A first insulating layer 102 is formed on a surface of substrate 100. For example, the first insulating layer 102 is formed via a thermal oxidation. First insulating layer 102 is covered by a conductive layer 104. Conductive layer 104 may be built up from silicon and/or a metal, for example. For example, conductive layer 104 is a buried polysilicon layer. In a later method step, a printed conductor and/or an electrode may be formed from conductive layer 104. Conductive layer 104 has a layer thickness hs1, which is between 0.3 µm and 1 µm, for example. Conductive layer 104 has a layer thickness hs1 of 0.5 µm.

Conductive layer 104 is covered by a second insulating layer 106. A first layer 108 is subsequently applied on second insulating layer 106. First layer 108 includes a semiconductor material and/or a metal. For example, first layer 108 is a polycrystalline silicon layer. A layer thickness hs2 of first layer 108 is in a range between 0.3 µm and 3 µm, for example. Layer thickness hs2 of first layer 108 is, e.g., approximately 1.8 µm.

One surface of first layer 108 is subsequently covered at least partially using a third insulating layer 110. For example, an insulating material is applied on the surface of first layer 108. Subsequently, openings (not shown) may be etched into third insulating layer 110. Third layer 110 may be an oxide layer, like first insulating layer 102 and second insulating layer 106. Insulating layers 102, 106, and 110 may be used for the purpose of insulating electrically interconnected components of the rotation sensor device formed later from one another. Furthermore, insulating layers 102, 106, and 110 may be etch stop layers for executing the method described here.

Insulating layers 102, 106, and 110 may be locally removed in later method steps using simple etching methods. Therefore, the individual components, which are structured out of the semiconductor and/or metal layers of the rotation sensor device produced hereafter, may be decoupled from one another by at least partial removal of insulating layers 102, 106, and 110 and may thus be designed to be separate and displaceable in relation to one another.

First layer 108 is an etching protection layer for etching of third insulating layer 110, for example. In particular, first layer 108 may be an etching protection layer for gas phase etching. First layer 108 ensures etching of third insulating layer 110, without one of insulating layers 102 or 106 lying underneath being attacked. This is advantageous above all if at least one printed conductor is structured out of conductive layer 104 before an application of second insulating layer 106.

After the at least partial covering of the top of first layer 108 using third insulating layer 110, a second layer 112 is applied, which is made of a semiconductor material and/or a metal. Second layer 112 is a polycrystalline silicon layer and has a layer thickness hs3, which is significantly greater than layer thickness hs2 of first layer 108. Layer thickness hs3 may be between 8 µm and 20 µm, for example.

If third insulating layer 110 has through openings between first layer 108 and second layer 112, areas of second layer 112 contact the top of first layer 108. In this way, areas of second layer 112 may be coupled directly to first layer 108. It is simultaneously ensured by third insulating layer 110 between first layer 108 and second layer 112 that areas of second layer 112 may be decoupled from first layer 108 via simply executable etching steps. This ensures a mobility of components from areas of layers 108 and 112 with respect to one another.

In a further course of the manufacturing method, at least one subunit of an electrode, which is fixedly connected to an oscillating mass of a rotation sensor, is structured out of second layer 112. At least one spring is also structured out of first layer 108, via which the oscillating mass is connected to a holding device of the rotation sensor device. In addition, a further subunit of the electrode fixedly connected to the oscillating mass may be formed from first layer 108. Furthermore, first layer 108 may also be used to provide a material for a counterelectrode to an oscillating mass, which is formed at least partially from second layer 112. Possible shapes of the components of the rotation sensor device structured out of first layer 108 and second layer 112 and their configuration to one another are described on the basis of the following figures. The further steps of the manufacturing method result for one skilled in the art from a comparison of the figures and is therefore not described here.

Embodiments of the present invention is not restricted to a manufacturing method in which the at least one spring is structured out of a first layer 108, which is situated under second layer 110, from which the at least one electrode fastened to the oscillating mass is at least partially formed. Instead, one skilled in the art may also expand the manufacturing method described on the basis of, e.g., FIG. 4, in such a way that first layer 108 is applied to second layer 112.

Figure 5:
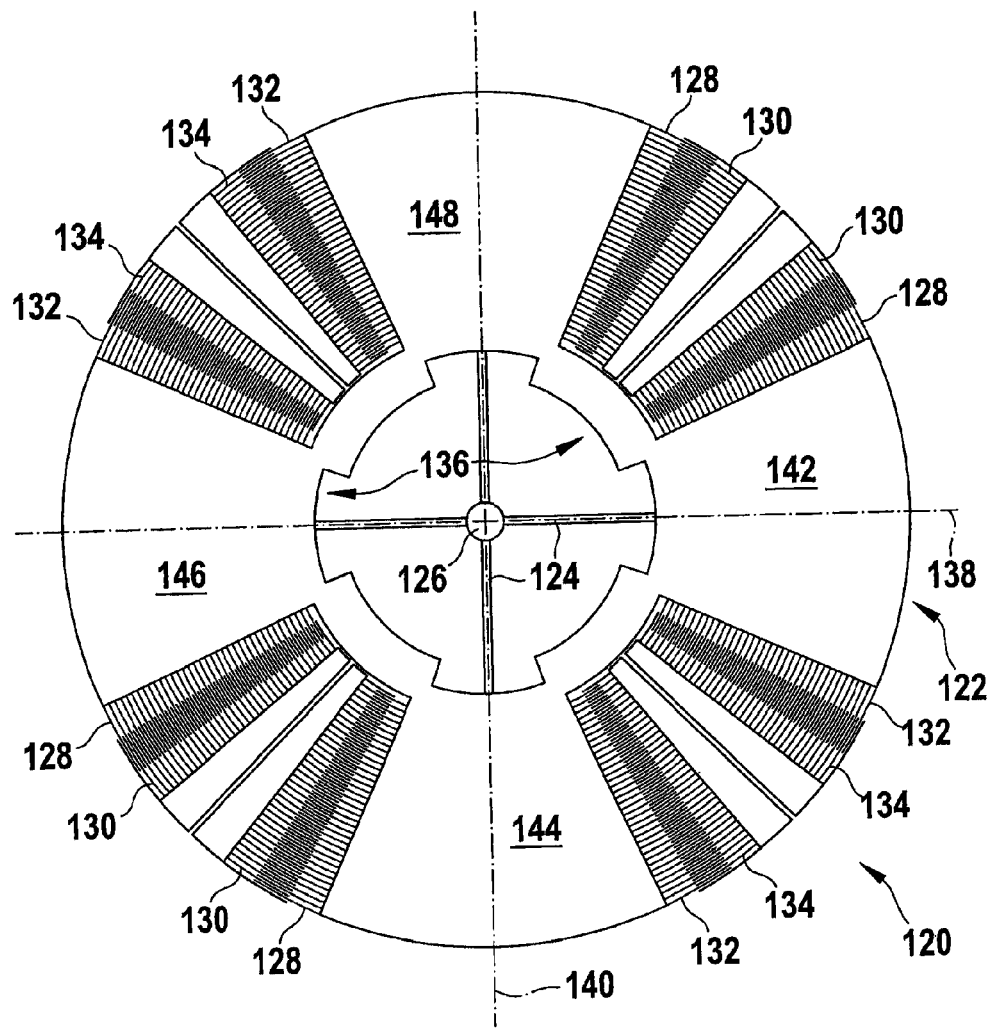
FIG. 5 shows a top view of components of a first specific embodiment of the rotation sensor device.

FIG. 5 shows a top view of components of a first specific embodiment of the rotation sensor device.

Schematically shown rotation sensor device 120 has a disc-shaped oscillating mass 122, which is connected to a hub 126 with the aid of four springs 124. Hub 126 is the single illustrated component of a holding device of rotation sensor device 120, in relation to which oscillating mass 122 is displaceable. An end of hub 126 oriented opposite to oscillating mass 122 is fixedly connected to a substrate (not shown) of the holding device.

Areas of oscillating mass 122 are designed as drive electrodes 128. Drive electrodes 128 of oscillating mass 122 have the form of comb electrodes. Adjacent to each drive electrode 128 of oscillating mass 122, a drive electrode 130 working together therewith, is fixedly connected to the holding device of rotation sensor device 120. Drive electrodes 128 and 130 are units of an electrostatic drive, via which oscillating mass 122 may be set into an oscillating movement around an oscillation axis running along the longitudinal direction of hub 126 by applying a voltage between drive electrodes 128 and 130.

In order to detect the oscillating movement of oscillating mass 122 around the oscillation axis, additional sensor electrodes 132 are formed on oscillating mass 122. For example, sensor electrodes 132 have the form of comb electrodes. Each of sensor electrodes 132 of oscillating mass 122 works together with an adjacent sensor electrode 134, which is fixedly connected to the holding device of rotation sensor device 120. Each two sensor electrodes 132 and 134, which work together, are coupled to one electrode of a capacitor. Like drive electrodes 130 of the holding device, sensor electrodes 134 of the holding device are also not displaced in their location by an oscillation of the oscillating mass 122. The oscillation of oscillating mass 122 around the oscillation axis thus causes a change in the capacitance of the capacitors coupled to sensor electrodes 132 and 134. The amplitude and/or the angular velocity of the oscillating movement of oscillating mass 122 around the oscillation axis may be ascertained by an analysis of the capacitance of the capacitor.

If rotation sensor device 120, with an oscillating mass 122 rotating around the oscillation axis, experiences a rotation around a rotational axis which is not parallel to the oscillation axis, Coriolis forces act on moving oscillating mass 122. These Coriolis forces may cause an additional movement of oscillating mass 122 in relation to the substrate.

In rotation device 120, springs 124, which are situated in a central opening 136 of oscillating mass 122, are designed in such a way that the Coriolis forces may cause an additional rotational movement of oscillating mass 122 around an axis lying in a plane spanned by both rotational axes 138 and 140. This rotational movement of oscillating mass 122 may also be referred to as tilting/pivoting of oscillating mass 122 around at least one of two rotational axes 138 and 140. The location of rotational axes 138 and 140 is established via the configuration of springs 124 on hub 126. If rotation sensor device 120 has four springs 124, each two springs 124 may be oriented parallel to one another, the longitudinal axes of both springs 124, which are parallel to one another, lying on a rotational axis 138 or 140. The two rotational axes of rotation sensor device 120 are situated offset to one another by an angle of 90°.

This tilting/pivoting of oscillating mass 122 around at least one rotational axis 138 or 140 causes a change in a mean distance between at least two circular sectors 142 through 148 of oscillating mass 122 and the substrate. Each of circular sectors 142 through 148 is formed between a drive electrode 128 and an adjacent sensor electrode 132 of oscillating mass 122. Circular sectors 142 through 148 are each situated offset to one another by 90° on oscillating mass 122.

In an embodiment of the present invention, a rotational movement of oscillating mass 122 around first rotational axis 138 (during a rotation of rotation sensor device 120 around the second sensitive axis lying on the second rotational axis) causes a change in the mean distances of circular sectors 144 and 148 from the substrate. Correspondingly, tilting/pivoting of oscillating mass 122 around second rotational axis 140 (in the event of a rotation sensor device 120 which is rotating around the first sensitive axis lying on the first rotational axis) results in changes in the mean distances of circular sectors 142 and 146 from the substrate. In order to determine these changes in the mean distances of circular sectors 142 through 148 from the substrate lying underneath, circular sectors 142 through 148 are designed as electrodes. In addition, a counterelectrode (not shown) is situated on the substrate below each circular sector 142 through 148. Each circular sector 142 through 148 and the adjacent counterelectrode are coupled to one electrode of a capacitor. A change in a mean distance thus causes an increase or decrease in the capacitance of the associated capacitor.

The Coriolis forces acting on an oscillating mass 122 rotating around the oscillation axis correspond in their directions and in their absolute values to the spatial location and the rotational velocity of the rotational movement of rotation sensor device 120. The changes in the mean distances of circular sectors 142 through 148 with respect to the substrate and the resulting capacitance changes in the associated capacitors are thus proportional to the spatial location and the rotational velocity of the rotational movement of rotation sensor device 120. Because analysis methods for ascertaining this variable from the capacitances of the capacitors associated with circular sectors 142 through 148 are known from the related art, they are not discussed in greater detail here.

Springs 124, which are situated in central opening 136 and via which oscillating mass 122 is connected to hub 126, have a height which is significantly less than a height of a drive and/or sensor electrode 128 through 134. The heights of springs 124 and electrodes 128 through 134 are the maximum widths of components 124 and 128 through 134 in a direction parallel to the oscillation axis.

For example, the height of springs 124 is between 1.5 μm and 2 μm, while the height of a drive electrode 128 or 130 and/or a sensor electrode 132 or 134 is between 8 μm and 15 μm. The height of springs 124, at 1.8 μm, may be less by a factor of 5 than a height of electrodes 128 through 134 of 10.6 μm. This has an advantageous effect on the bending stiffness and/or on the torsional stiffness of a spring 124. The bending stiffness shown specifies the bending ability of a spring 124 in a direction parallel to the oscillation axis. The torsional stiffness corresponds to a bending ability of a spring around its longitudinal axis.

Because of the reduction in the bending stiffness and/or the torsional stiffness of a spring 124, springs 124 may be designed to be shorter and/or more compact, springs 124 simultaneously maintaining their functional capability for rotational sensor device 120. A shorter spring 124 allows a smaller opening 136 and thus a smaller diameter of oscillating mass 122, which makes it easier to install rotation sensor device 120 in a rotating body. In addition, circular sectors 142 through 148, which are used as the surfaces of detection electrodes, may be situated closer to hub 126 to increase the idle capacitance of rotation sensor device 120.

As an alternative or supplement thereto, the reduced bending stiffness and/or the reduced torsional stiffness ensure a significantly less pronounced meandering and/or spiraling shape of a spring 124, which is suitable for rotation sensor device 120. This allows a more symmetric mass distribution along a longitudinal axis of spring 124. This may also be referred to as a design of the suspension formed from springs 124 having improved symmetry. This improved symmetry of the suspension contributes significantly to a reduction of the crosstalk behavior occurring in a typical yaw-rate sensor. In addition, a spring 124 having a less pronounced meandering shape requires less installation surface area and less complex work steps for the exact layout of spring 124.

In particular, the height of springs 124, which is reduced with respect to the height of electrodes 128 through 134, may be used for the purpose of dispensing with a meandering design of springs 124. In this case, springs 124 have a bar shape as shown in FIG. 5. Each two springs 124 run along a rotational axis 138 or 140, the rotational axes being oriented at an angle of 90° to one another. The suspension of oscillating mass 122 on hub 126, which is formed from four springs 124, thus has complete 90° rotational symmetry and also complete 180° mirror symmetry. The cross sensitivity is thus improved and the typically occurring crosstalk behavior in rotation sensor device 120 is avoided efficiently and simply. Rotation sensor device 120 thus outputs false reports at only a comparatively low, typically negligibly low, probability.

Rotation sensor device 120 shown in FIG. 5 may be manufactured using a manufacturing method described on the basis of FIGS. 3 and 4. For example, components 122 through 134 and 142 through 148, which are shown in FIG. 5, are structured out of the layer sequence shown in FIG. 4. Springs 124 may be shaped out of the first layer having a comparatively small layer thickness, which ensures the above-mentioned advantages in regard to the bending stiffness and/or the torsional stiffness. Oscillating mass 122 having electrodes 134 through 138 and circular segments 142 through 148 may be structured at least partially out of the relatively thick second layer. It is ensured by the relatively great height of electrodes 128 through 134 that a sufficient electrostatic force is generated to excite oscillating mass 122 for a rotational movement around the oscillation axis. The detection precision of sensor electrodes 132 through 134 is also increased in this way.

In order to additionally increase the heights of electrodes 128 through 134, before an application of the second layer, the third insulation layer may be removed on the areas lying below the areas of later electrodes 128 through 134. The second layer thus contacts the first layer in these areas. Electrodes 128 through 134 may thus also be etched into the second layer. The height of electrodes 128 through 134 is thus the sum of the layer thicknesses of the first layer and the second layer.

Hub 126 may also be formed at least partially from the second layer. Hub 126 also contains areas of the first layer.

The counterelectrodes (not shown), which work together with circular sectors 142 through 148 designed as the detection electrode surfaces, may be etched out of the conductive layer applied to the substrate. The printed conductors leading to the counterelectrodes may also be formed from the conductive layer. The structuring of the counterelectrodes and the printed conductors out of the conductive layer may be performed before an application of the second insulation layer. The first insulating layer and the second insulating layer are protected in this case by the first layer during an etching of the third insulating layer. The first layer may thus also perform the function of an etching protection layer. This is advantageous in particular in the event of gas phase etching.

The etching of the third insulating layer is performed in such a way that springs 124, which are formed completely from the first layer, remain fixedly connected to oscillating mass 122. Because corresponding etching methods are known from the related art, they will not be discussed in greater detail here.

Figure 6A:
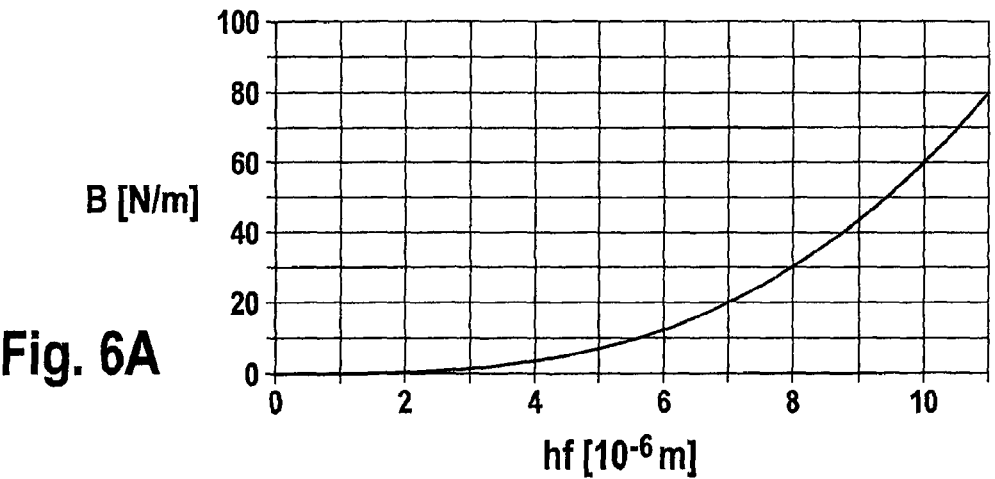
FIG. 6A shows a two coordinate system to illustrate a relationship between a height, a torsional stiffness, and a bending stiffness of a spring of the rotation sensor device of FIG. 5.
Figure 6B:
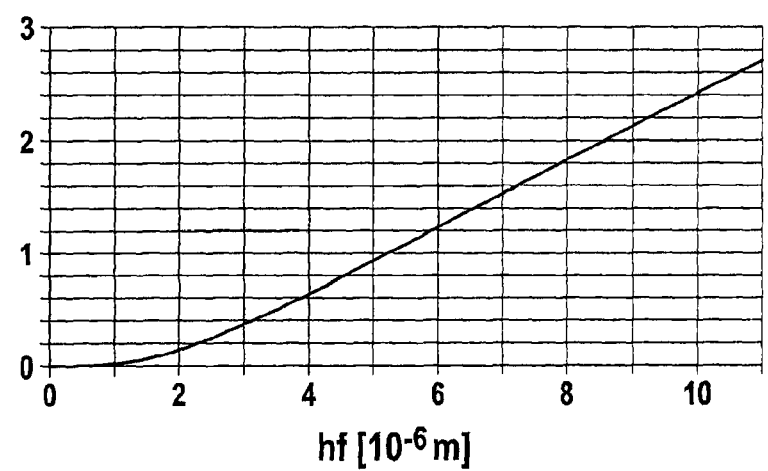
FIG. 6B shows a two coordinate system to illustrate a relationship between a height, a torsional stiffness, and a bending stiffness of a spring of the rotation sensor device of FIG. 5.

FIGS. 6A and 6B show two coordinate systems to illustrate a relationship between a height, a torsional stiffness, and a bending stiffness of a spring of the rotation sensor device of FIG. 5. In the two coordinate systems, the abscissa corresponds to a height hf of a spring. The ordinate of the coordinate system of FIG. 6A specifies associated bending stiffness B in N/m. The coordinate system shown in FIG. 6B has torsional stiffness T in Nm/radians as the ordinate.

The springs having height hf are designed as bar springs made of silicon. They have a width of 3 μm and a length of 200 μm. As is clear on the basis of the coordinate systems, bending stiffness B and torsional stiffness T are significantly a function of height hf of a spring. For example, a reduction of height hf of a spring by a factor of at least 5 from 10.6 μm to 1.8 μm causes a reduction of the bending stiffness by a factor of nearly 200, while the torsional stiffness is concurrently reduced by a factor of approximately 20.

Bending stiffness B and torsional stiffness T specify the out-of-plane bending stiffness and the out-of-plane torsional stiffness, which counteract the displacement movement of the oscillating mass upon the displacement/tilting of the oscillating mass around at least one of the sensitive axes. The displacement/tilting of the oscillating mass around at least one of the sensitive axes is thus made much easier by the significant reduction of bending stiffness B and torsional stiffness T. The rotation of the body having the rotational sensor device may be detected better on the basis of the significantly more pronounced displacement movement of the oscillating mass around at least one of the sensitive axes.

Figure 7A:
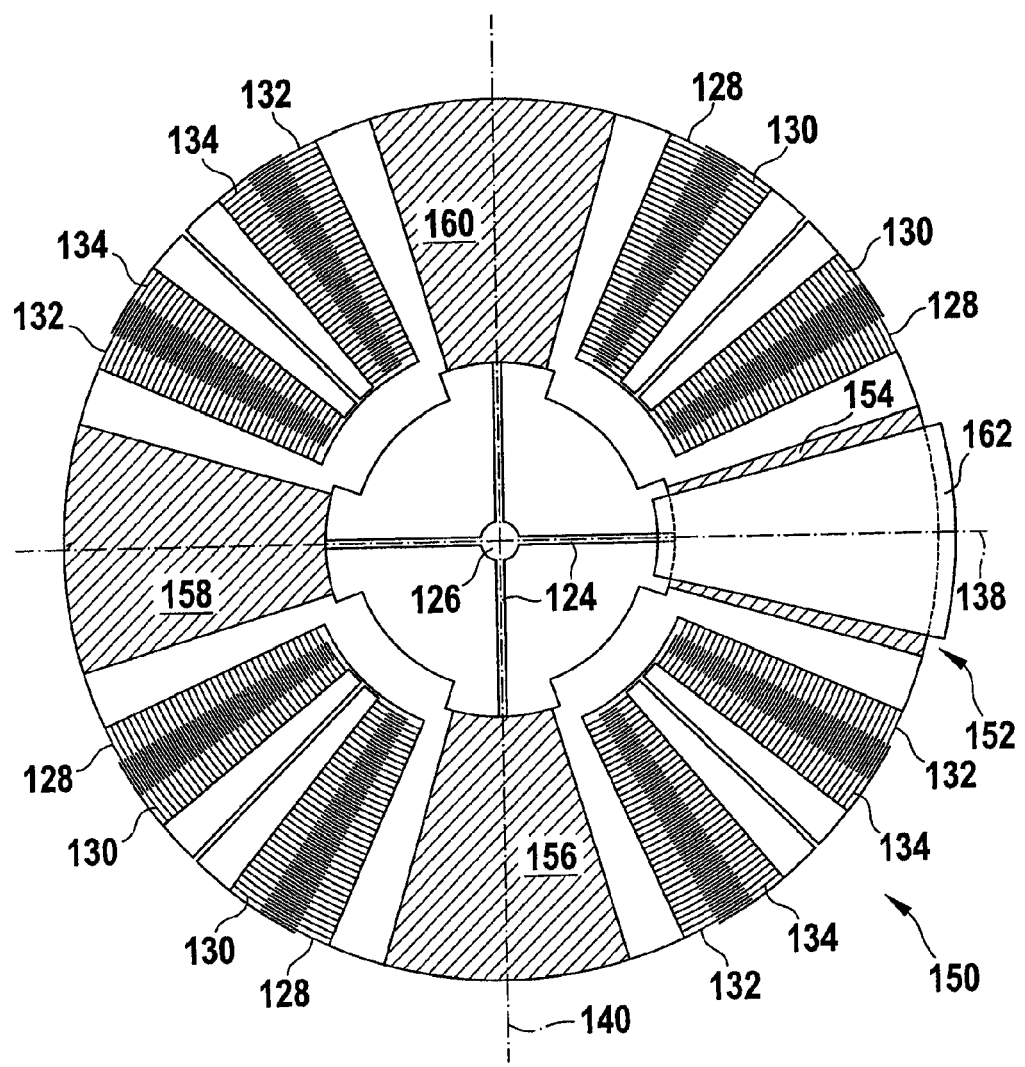
FIG. 7A shows a schematic illustration of a top view of components of the rotation sensor device.
Figure 7B:
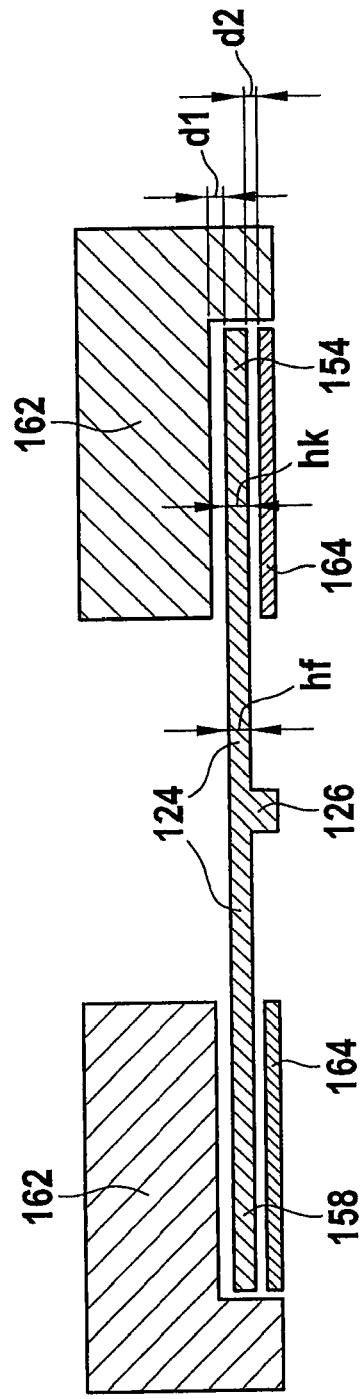
FIG. 7B shows a schematic illustration of a cross section along a sensitive axis of the rotation sensor device.

FIGS. 7A and 7B show schematic illustrations of a second specific embodiment of the rotation sensor device. FIG. 7A showing a top view of components of the rotation sensor device and FIG. 7B showing a cross section along one sensitive axis of the rotation sensor device.

Schematically shown rotation sensor device 150 has an oscillating mass 152, which is suspended via four springs 124 on hub 126, which is connected to the holding device. Springs 124 may be designed as bar springs. For example, springs 124 are shaped from silicon and have a width of 3 μm and a length of 200 μm. Each two springs 124 are situated along one sensitive axis of rotation sensor device 150. Springs 124 define the locations of rotational axes 138 and 140, around which oscillating mass 152 is tiltable/pivotable with respect to a substrate of the holding device.

Drive and sensor electrodes 128 and 132 are formed on oscillating mass 152, and work together with drive electrodes 130 and 134, which are fixedly connected to the holding device, in the way already described above. The procedure for ascertaining a rotation of rotation sensor device 150 around at least one sensitive axis lying on a rotational axis 138 or 140 is therefore not described once again.

FIG. 7B shows a cross section along a sensitive axis of rotation sensor device 150 lying on rotational axis 138. It is apparent that oscillating mass 152 of rotation sensor device 150, in contrast to the specific embodiment described above, has circular sectors 154 through 160, whose height hk is equal to height hf of springs 124. Heights kf and hk of springs 124 and circular sectors 154 through 160 are significantly less than the height (not shown) of electrodes 128 through 134. This ensures a significant reduction of the total mass of oscillating mass 152. Oscillating mass 152 may thus be set into an oscillating movement around an oscillation axis running along hub 126 with the aid of a smaller electrostatic force. An electrostatic drive used to move oscillating mass 152 may thus be implemented more cost-effectively.

As a further supplementation of rotation sensor device 150 compared to the specific embodiment described above, additional counterelectrodes 162 are situated above circular sectors 154 through 160. However, only one of counterelectrodes 162 is shown in FIG. 7A for a better overview.

The function of counterelectrodes 162 may be explained on the basis of the cross section of FIG. 7B. Each of illustrated circular sectors 154 and 158 is situated between an upper counterelectrode 162 and a lower counterelectrode 164. In its resting position, circular sector 154 has a mean distance d1 to upper counterelectrode 162 and a mean distance d2 to lower counterelectrode 164. If Coriolis forces act on oscillating mass 152, which cause tilting of oscillating mass 152 around sensitive axis 140, mean distances d1 and d2 change. By attaching upper counterelectrode 162 to oscillating mass 152, not only is the change in distance d2 between circular sector 154 and lower counterelectrode 164 detectable, but also a variation of distance d1 between upper counterelectrode 162 and circular sector 154 is detectable. The tilting/pivoting of oscillating mass 152 around rotational axis 140 may thus be determined more reliably and precisely. This also applies correspondingly to further circular sectors 156 through 160 and counterelectrodes 162 and 164 working together therewith. Each upper counterelectrode 162 and a lower counterelectrode 164 diametrically opposite thereto may be set to an equal potential. Upper electrodes 162 may be contacted from an outside of rotation sensor device 150. Of course, counterelectrodes 162 and 164 may also be contacted from the inner side of rotation sensor device 150. Because of the higher capacitance per unit of surface area of complete counterelectrodes 162 and 164, the contacts may be designed to be smaller.

Rotation sensor device 150 has a larger total detection surface of counterelectrodes 162 and 164 than the specific embodiment described above and thus allows a better signal-to-noise ratio. As an alternative to an improved signal-to-noise ratio, rotational sensor device 150 may also have an oscillating mass 152 having a smaller diameter, because the ratio of capacitance per unit of surface area to the surface is greater.

Rotation sensor device 150 shown on the basis of FIGS. 7A and B may be formed using the manufacturing method already described. In a particularly advantageous specific embodiment of the manufacturing method, circular sectors 154 through 160 and springs 124 are exclusively structured out of the first layer of the layer sequence of FIG. 4. In contrast, upper counterelectrodes 162 are at least partially formed from the second layer. Lower counterelectrodes 164 may be shaped out of the conductive layer.

In order to ensure the most advantageous possible height of electrodes 128 through 134, the electrodes may be structured out of the first layer and the second layer. After an application of the first layer and the third insulating layer, through openings are etched in the third insulation layer. In particular, the third insulating layer is removed from the areas of the first layer from which subunits of electrodes 128 through 134 are structured out in a method step executed later. This ensures that the areas of the second layer for structuring out the subunits of electrodes 128 through 134 contact the first layer directly. In contrast, the areas of the first layer which form later circular segments 154 through 160 and springs 124 are still covered by the third insulating layer. The areas of the second layer from which upper counterelectrodes 162 are formed are situated spaced apart from circular sectors 154 through 160 (see FIG. 7B).

The comparatively great height of electrodes 128 through 134, which may be implemented simply in this way, ensures good functional capability of the electrostatic drive. In particular, only comparatively small voltages thus have to be applied between drive electrodes 128 and 130. Concurrently, the analysis circuit for an analysis of the capacitances of sensor electrodes 132 and 134 may be simplified and a more cost-effective sensor module may thus be used.

In this way, rotation sensor device 150, which has the advantages already described above, may be manufactured cost-effectively using work steps which are easily executable. As already described above, in addition to circular sectors 154 through 160, springs 124 may also be formed completely from the first layer. The first layer may simultaneously be used as an etching protection layer.

Figure 8:
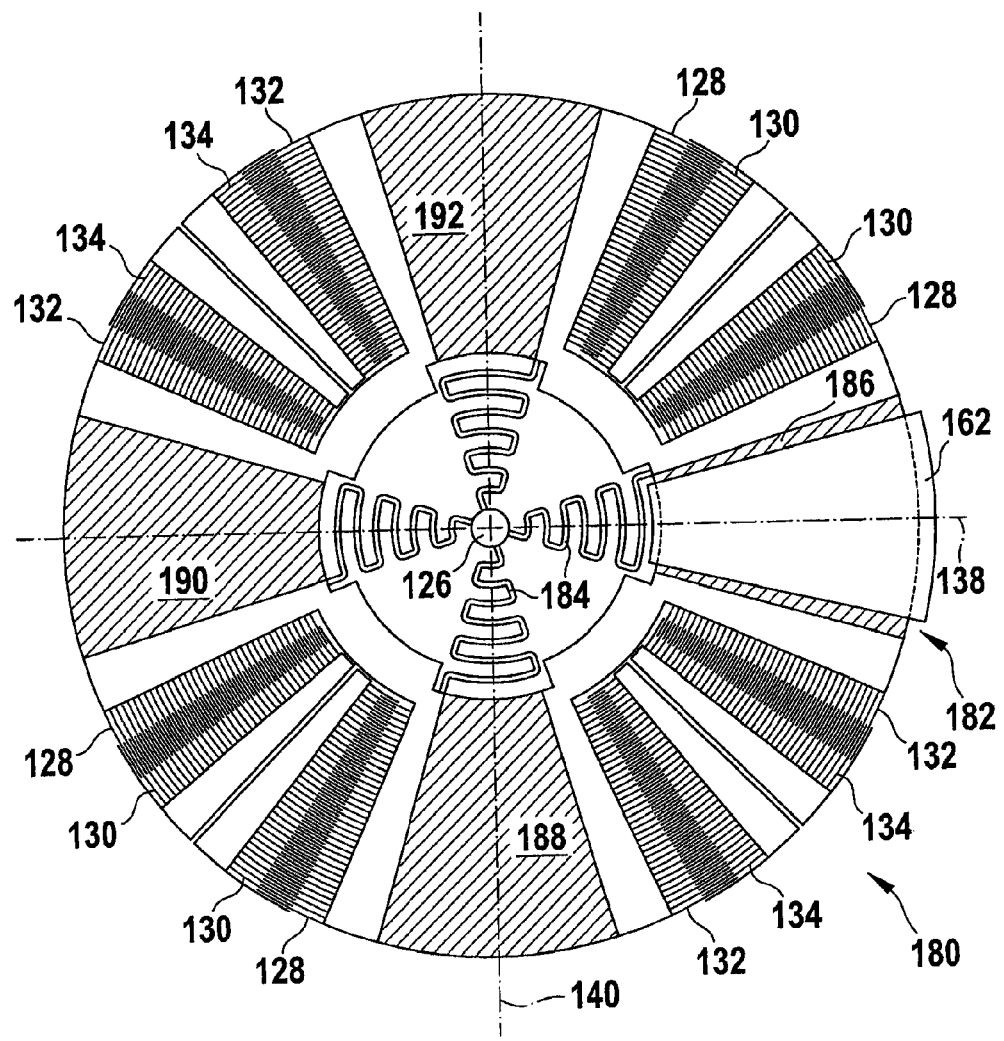
FIG. 8 shows a top view of components of a third specific embodiment of the rotation sensor device.

FIG. 8 shows a top view of components of a third specific embodiment of the rotation sensor device.

In schematically illustrated rotation sensor device 180, an oscillating mass 182 is suspended with the aid of four meandering springs 184 on a hub 126. Instead of a meandering shape, springs 184 may also have another shape. For example, springs 184 of one specific embodiment of rotation sensor device 180 may also be spiral springs.

Drive electrodes 128 and sensor electrodes 132, which were already described, are situated on oscillating mass 182. Drive electrodes 130 and sensor electrodes 134, which work together with electrodes 128 and 132, are fixedly connected to a substrate (not shown), to which the end of hub 126 oriented opposite to oscillating mass 182 is also fastened. For example, electrodes 128 through 134 may be designed as comb electrodes. The cooperation of electrodes 128 through 134, which was already described above, will not be discussed again here.

In contrast to the specific embodiments of the rotation sensor device described above, meandering springs 184 have a height which is significantly greater than 2 μm along the longitudinal direction of hub 126. For example, the height of meandering springs 184 is in a range between 8 μm-15 μm. In order to allow an oscillating movement of oscillating mass 182 around an oscillation axis running through hub 126 in spite of the comparatively great height of meandering springs 184, the meandering shape of meandering springs 184 is very pronounced. Oscillating mass 182 may thus execute the desired oscillating movement around the oscillation axis because of the very pronounced meandering shape of meandering springs 184.

Meandering springs 184 are additionally designed in such a way that an oscillating mass 182, which is set into an oscillating movement around the oscillation axis using drive electrodes 128 and 130, is tiltable/pivotable around at least one of rotational axes 138 or 140 during a rotation of rotation sensor device 180 around a sensitive axis. Because the relationship between a rotation of rotation sensor device 180 around a rotational axis lying in the plane spanned by the sensitive axes and a tilting/pivoting of oscillating mass 182 around rotational axes 138 and/or 140 caused by the Coriolis force was already described above, reference is only made to these passages here.

Disc-shaped oscillating mass 182 has four circular sectors 186 through 192. Each of circular sectors 186 through 192 is situated between a drive electrode 128 and an adjacent sensor electrode 132. Circular sectors 186 through 192 are situated offset to one another by 90° on oscillating mass 182. Circular sectors 186 through 192 have a height along the longitudinal direction of hub 126 which is significantly less than the height of meandering springs 184. In contrast, electrodes 128 through 134 are designed in such a way that their height along the longitudinal direction of hub 126 is greater than the height of meandering springs 184. A good electrostatic interaction between two electrodes 128 through 134, which work together, is ensured by the comparatively great height of electrodes 128 through 134. The comparatively small height of circular sectors 186 contributes to reducing the total mass of oscillating mass 182. Oscillating mass 182 having the reduced mass therefore displays a more pronounced deflection upon tilting around at least one rotational axis 138 or 140 at a predefined level of the Coriolis force than an oscillating mass having a greater mass. The reduced height of circular sectors 186 thus ensures a better signal-to-background [noise] ratio.

In a refinement, upper counterelectrodes 162, which were already described on the basis of the preceding specific embodiments, may be situated above circular sectors 186 through 192. The comparatively small height of circular sectors 186 through 192 thus offers the capability of situating upper counterelectrodes 162 on oscillating mass 182 in a space-saving way. However, only one upper counterelectrode 162 is shown above circular sector 186 in FIG. 8 for a better overview.

In addition to upper counterelectrodes 162, lower counterelectrodes may also be situated on oscillating mass 182. The advantages of a concurrent use of upper counterelectrodes 162 and lower counterelectrodes (not shown) were already discussed on the basis of the preceding specific embodiment. For example, upper and lower counterelectrodes 162 ensure a more reliable and precise establishment of tilting of oscillating mass 182 around at least one of both rotational axes 138 and 140.

In a rotation sensor device 180 having lower and upper counterelectrodes 162, a larger total detection surface is provided. Rotation sensor device 180 may thus also have an oscillating mass 182 having a smaller diameter, without the signal-to-noise ratio of rotation sensor device 180 worsening compared to a signal-to-noise ratio of a rotation sensor device which exclusively has the lower electrodes.

Rotation device 180, which is schematically shown in FIG. 8, may be manufactured using the manufacturing method described on the basis of FIG. 3. In contrast to the manufacturing method of FIG. 4, meandering springs 184 are structured out of a first layer, which has a comparatively large first layer thickness. In contrast, circular sectors 186 through 192 are formed exclusively from a second layer, whose second layer thickness is significantly less than the first layer thickness.

Electrodes 128 through 134 are composed of areas of the first layer and also areas of the second layer. The height of electrodes 128 through 134 is equal in this case to the sum of the first and the second layer thicknesses. For example, before an application of the upper of the first layer and the second layer to the lower of the two layers, the insulating layer is removed from the areas of the lower of the two layers from which subunits of electrodes 128 through 134 are formed later. The terms used of a first layer and a second layer do not establish a sequence for the application of the layers.

The further steps of a manufacturing method for rotation device 180 result in a simple way for one skilled in the art on the basis of the descriptions of the preceding figures.

The present invention described on the basis of the above paragraphs is not restricted to rotation sensor devices having two sensitive axes. Instead, embodiments of the present invention described here may also be used in a rotation sensor device having only one sensitive axis. For example, rotation sensor devices of this type are used in a motor vehicle having an electronic stability program ESP, for navigation, and/or for rollover sensing. In home electronics, the rotation sensor devices may also be used in the fields of image stabilization, movement selection, and/or navigation.

What is claimed is:

1. A manufacturing method for a rotation sensor device having a holding device, an oscillating mass, and at least one spring, via which the oscillating mass is connected to the holding device, the at least one spring being designed in such a way that the oscillating mass can be set into an oscillating movement around an oscillation axis with respect to the holding device with the aid of a drive, comprising the following steps:
   producing a layer sequence having a first layer made of a semiconductor material and/or a metal and a second layer made of a semiconductor material and/or a metal, a boundary surface of the first layer, which faces toward the second layer, being at least partially covered by an insulating layer;
   structuring the at least one spring out of the first layer; and
   structuring at least one oscillating mass subunit of the oscillating mass, which can be set into the oscillating movement around the oscillation axis with the aid of the drive, out of the second layer;
   wherein the first layer having a first layer thickness and the second layer having a second layer thickness, which is unequal to the first layer thickness, are formed;
   wherein the first layer and the second layer are formed in such a way that the second layer thickness is greater than the first layer thickness by a factor of at least 5; and
   wherein at least one electrode is fixedly connected to the oscillating mass and is structured out of the second layer.

2. The manufacturing method as recited in claim 1, comprising:
   fixedly connecting at least one first electrode to the holding device;
   fixedly connecting at least one second electrode to the oscillating mass; and
   forming the drive, which is designed as an electrostatic drive, so that a voltage can be applied between the at least one first electrode and the at least one second electrode, and the oscillating mass can be set into the oscillating movement around the oscillation axis by the voltage applied between the at least one first electrode and the at least one second electrode.

3. The manufacturing method as recited in claim 2, wherein at least one electrode subunit of the second electrode is structured out of the second layer, at least one through opening is formed above at least one subarea of the first layer in the insulating layer and the at least one through opening is filled using the material of the second layer, and a further electrode subunit of the second electrode is structured out of the at least one subarea of the first layer.

4. The manufacturing method as recited in claim 1, wherein a further one-piece oscillating mass subunit of the oscillating mass is structured out of the first layer.

5. The manufacturing method as recited in claim 4, wherein at least one counterelectrode is structured out of the second layer, which is opposite to an oscillating mass partial surface structured out of the boundary surface of the first layer facing toward the second layer, and a sensor unit is formed, which is designed for the purpose of ascertaining a capacitance formed by the at least one counterelectrode and the at least one oscillating mass partial surface.

6. The manufacturing method as recited in claim 1, comprising:
   forming a first insulation layer on a substrate;
   forming a conductive layer on the first insulation layer;
   forming a second insulation layer on the conductive layer;
   forming the layer sequence on the second insulation layer; and
   structuring at least one conductor and/or at least one counterelectrode out of the conductive layer.

7. The manufacturing method as recited in claim 6, wherein the insulating layer, the first insulation layer, and the second insulation layer are formed from an insulating material, and the first layer completely covers the first insulation layer and/or the second insulation layer during etching of the insulating layer.

8. A rotation sensor device, comprising:
   a holding device;
   an oscillating mass; and
   at least one spring, via which the oscillating mass is connected to the holding device, the at least one spring being designed in such a way that the oscillating mass can be set into an oscillating movement around an oscillation axis with respect to the holding device with the aid of a drive and is structured out of a first layer of semiconductor material and/or a metal;
   wherein the at least one spring has a first height along the oscillation axis and at least one oscillating mass subunit of the oscillating mass, which can be set into the oscillating movement around the oscillation axis with the aid of the drive and is structured out of a second layer of semiconductor material and/or a metal, has a second height unequal to the first height;
   wherein a boundary surface of the first layer, which faces toward the second layer is at least partially covered by an insulating layer;
   wherein the first layer having a first layer thickness and the second layer having a second layer thickness, which is unequal to the first layer thickness, are formed;
   wherein the first layer and the second layer are formed in such a way that the second layer thickness is greater than the first layer thickness by a factor of at least 5; and
   wherein at least one electrode is fixedly connected to the oscillating mass and is structured out of the second layer.

9. The rotation sensor device as recited in claim 8, wherein the second height is greater than the first height.

10. The rotation sensor device as recited in claim 9, wherein the oscillating mass subunit of the oscillating mass is part of an electrode fixedly connected to the oscillating mass.

11. The rotation sensor device as recited in claim 8, wherein the at least one spring, via which the oscillating mass is connected to the holding device, is a bar spring.

12. The rotation sensor device as recited in claim 8, wherein the oscillating mass is additionally rotatable by a Coriolis force around a rotational axis, which is oriented nonparallel to the oscillation axis.

* * * * *